United States Patent
Schiesterl

[11] 3,802,531
[45] Apr. 9, 1974

[54] STEERING LOCK FOR MOTOR VEHICLES

[75] Inventor: Gerhard Schiesterl, Stuttgart, Germany

[73] Assignee: Daimler-Benz Aktiengesellschaft, Stuttgart-Untertuerkheim, Germany

[22] Filed: June 18, 1971

[21] Appl. No.: 154,440

[30] Foreign Application Priority Data
June 20, 1970 Germany.......................... 2030564

[52] U.S. Cl................. 180/114, 70/252, 180/103, 307/10 AT
[51] Int. Cl............................................... B60r 25/02
[58] Field of Search............ 180/103, 114, 82, 107, 180/110; 70/252; 307/10 AT; 340/63

[56] References Cited
UNITED STATES PATENTS

| | | | |
|---|---|---|---|
| 3,641,489 | 2/1972 | Shimomura......................... | 180/114 |
| 3,426,560 | 2/1969 | Dwan................................. | 180/114 |
| 3,250,142 | 5/1966 | Schuster et al. ................. | 180/103 X |
| 3,199,698 | 8/1965 | Schuster et al. ................. | 180/103 X |
| 2,214,567 | 9/1940 | Rosenthal.......................... | 180/107 |
| 3,119,458 | 1/1964 | Fritz.................................. | 180/114 |
| 3,021,913 | 2/1962 | Ouimet et al...................... | 180/114 |
| 2,063,088 | 12/1936 | Fitzgerald.......................... | 70/252 |
| 3,688,861 | 9/1972 | Lipschultz et al. ................ | 180/114 |
| 3,569,930 | 3/1971 | Hirama.............................. | 70/252 |

Primary Examiner—David Schonberg
Assistant Examiner—John P. Silverstrim
Attorney, Agent, or Firm—Craig and Antonelli

[57] ABSTRACT

A steering lock for motor vehicles with a prestressed locking bolt which engages into the steering spindle of the motor vehicle in its locking position and which is adapted to be retracted into its unlocked position in which it releases the steering spindle, by means of a locking drum of a cylinder lock combined with the steering lock when the electric system of the motor vehicle is turned on and the locking drum is rotated correspondingly into either the drive or assembly position; a solenoid controlled latching pin which is displaceably guided in the steering lock housing, is retracted by its spring force into its release position when the magnetic coil of the solenoid is de-energized with the vehicle at standstill, whereas it is displaced against the spring force through an opening in the steering lock housing into a latching position when the solenoid is energized with the vehicle in motion.

23 Claims, 4 Drawing Figures

INVENTOR
GERHARD SCHIESTERL

BY Craig, Antonelli & Hill
ATTORNEYS

STEERING LOCK FOR MOTOR VEHICLES

The present invention relates to a steering lock for motor vehicles with a prestressed locking bolt resiliently engaging in its locking position into the steering spindle, which during the activation of the electrical installation of the motor vehicle and a corresponding rotation of the locking drum into the drive or assembly (accessory) position thereof is adapted to be retracted into its unlocked position releasing the steering spindle, by the locking drum of a customary cylinder lock combined with the steering lock.

In such a known steering lock, the locking bolt is guided on the locking drum by means of a coulisse or guide frame through which the locking drum extends. The locking drum is provided with a flattened portion within the area of the guide frame which makes it possible to the locking bolt prestressed by a compression spring into its locking position, not only in the stop position but also some degrees prior thereto to snap into the locking position in which it engages into a recess of the steering spindle and thereby locks or blocks the same. This entails the disadvantage that in case of a rotation of the ignition key which is undertaken during the drive of the vehicle for any reason whatsoever, the steering can also be blocked during the drive after reaching the stop position at the ignition key if the steering spindle is in a straight drive position. Also, other known steering locks in which the locking bolt can snap into its locking position only after removal of the ignition key are still disadvantageous insofar as also with these prior art constructions a pulling out of the ignition key which has been turned beforehand into its stop position, is still possible during the drive which may also lead to a locking of the steering system during the drive.

The present invention is concerned with the task to avoid the aforementioned shortcomings and to so perfect the steering lock of the aforementioned type that a locking or blocking of the steering is possible only with a nearly stationary vehicle.

The underlying problems are solved according to the present invention in that a solenoid-controlled latching pin which is displaceably guided at the steering lock housing, is adapted to be displaced from a retracted release position, into which it is retracted by a spring force when the magnet coil of the solenoid is de-energized, with a latching position through an opening of the steering lock housing against the aforementioned spring force, when the magnet coil of the solenoid is energized, in which latching position it engages either into a segmental recess of the locking drum disposed in its drive or assembly (accessory) position or into a cross groove or the like of the locking pin disposed in its unlocked position, and in that the solenoid is adapted to be energized and de-energized by an electric switch which is closed by the tachometer shaft or another part coupled with the wheel drive of the vehicle when the vehicle is in motion and which is opened when the vehicle is at least nearly at standstill.

A steering lock thus perfected makes impossible for the locking bolt to snap-in into the recess or groove provided in the steering spindle while the vehicle is in motion. If the described latching pin engages during the drive into the mentioned segmental recess of the locking drum while the vehicle is in motion as a result of the switch closed by the tachometer shaft, then a turning-back of the locking drum and therewith of the ignition key into the stop position is prevented thereby. Consequently, also the locking bolt cannot reach any longer its locking position. If the latching pin engages during the drive of the vehicle and with a correspondingly energized solenoid into the cross groove or the like of the locking bolt which at that time is in its open or unlocked position, then a rotation of the locking drum into its stop position and a pulling out of the ignition key are possible; however, the locking bolt is retained in its open or unlocked position by the latching pin for such length of time until the vehicle comes to a standstill and the mentioned switch is again de-energized or opened by the tachometer shaft.

Accordingly, it is an object of the present invention to provide a steering lock for motor vehicles which avoids by simple means the aforementioned shortcomings and drawbacks encountered in the prior art.

Another object of the present invention resides in a steering lock for motor vehicles which precludes an inadvertent locking of the steering system while the vehicle is in motion.

A further object of the present invention resides in a safety system for the steering lock of a motor vehicle which precludes the inadvertent locking of the steering while the vehicle is driven.

A still further object of the present invention resides in a steering lock for motor vehicles which is extraordinarily reliable for its intended purposes, yet is simple in construction.

These and other objects, features, and advantages of the present invention will become more obvious from the following description when taken in connection with the accompanying drawing which shows, for purposes of illustration only, two embodiments in accordance with the present invention, and wherein:

FIG. 3 is a partial plan view on the ignition key opening of the steering lock of FIGS. 1 and 2.

Figure 1:
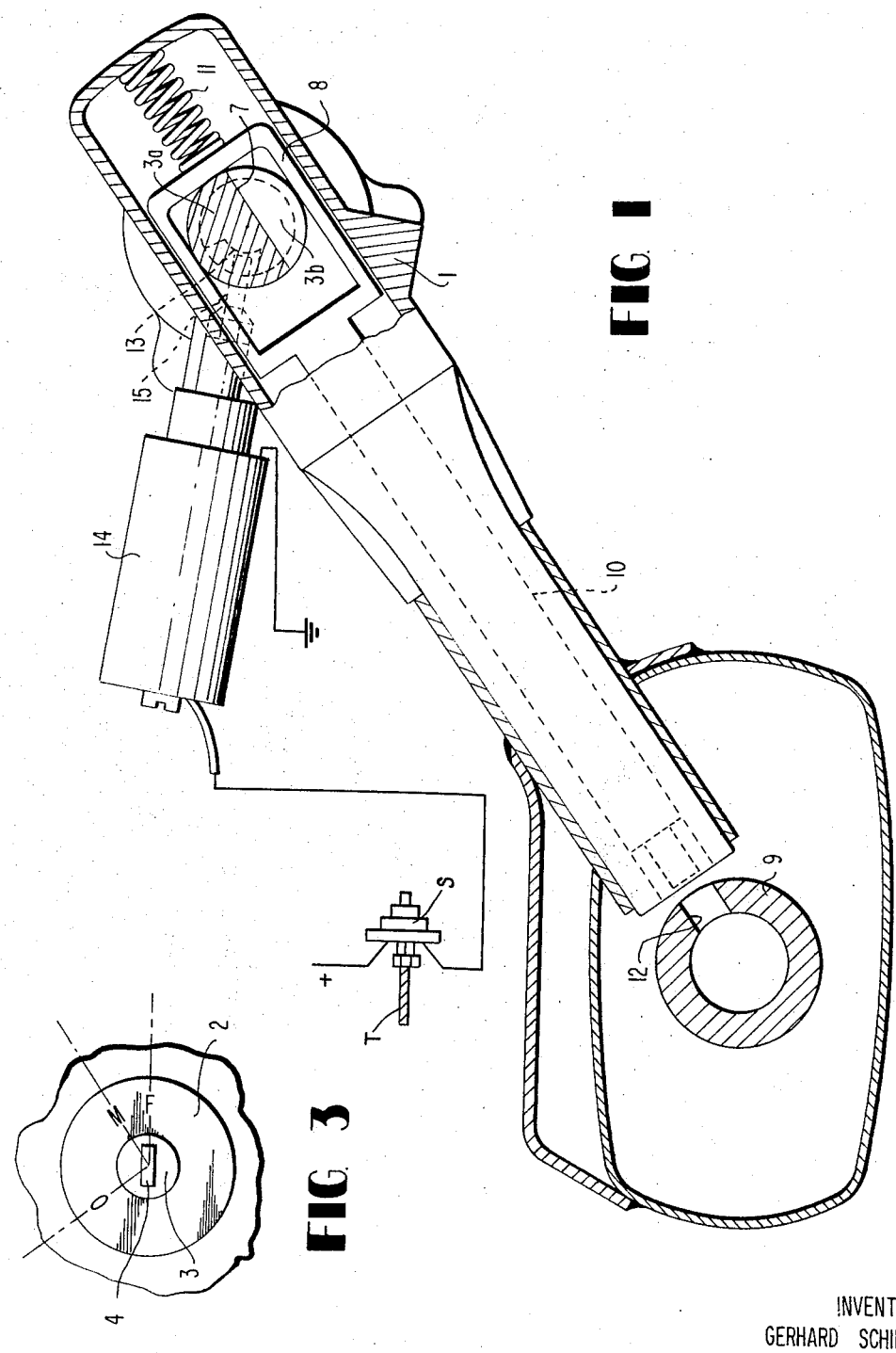
FIG. 1 is a schematic partial cross-sectional view of a steering lock according to the present invention, the partial cross-section being taken along the guide direction of the locking bolt.
Figures 2, 4:
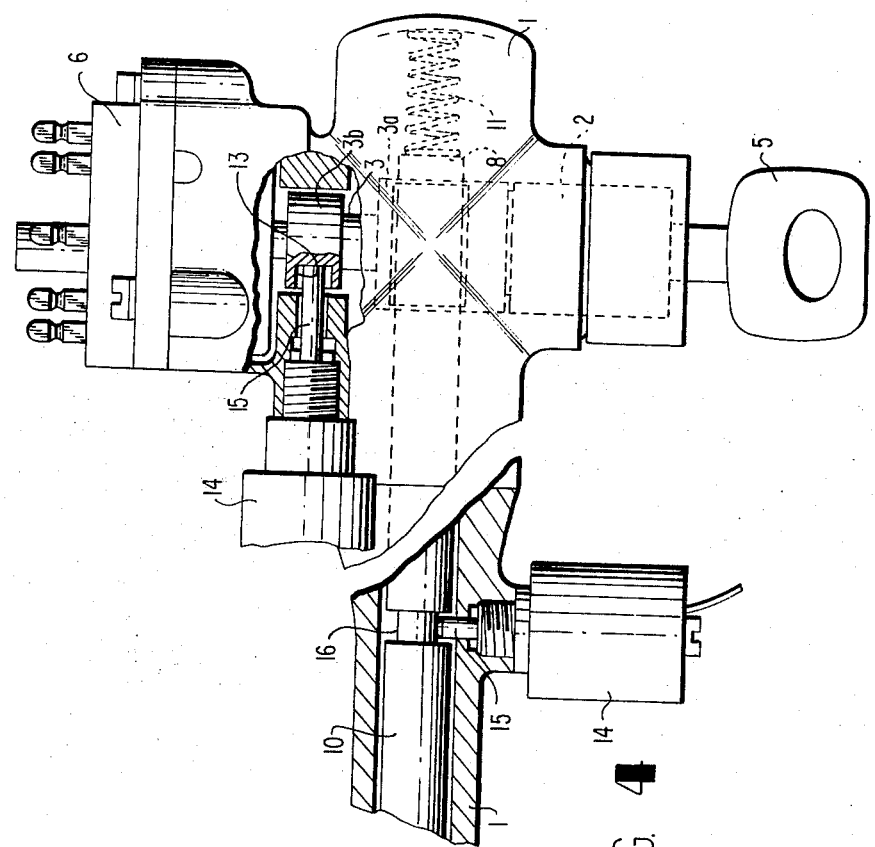
FIG. 2 is a schematic partial cross-sectional view of the steering lock of FIG. 1 as viewed from above, the partial cross-section being taken along the guide direction of the latching pin.
FIG. 4 is a schematic partial cross-sectional view through a modified embodiment of a steering lock in accordance with the present invention.

Referring now to the drawing wherein like refernece numerals are used throughout the various views to designate like parts, and more particularly to FIGS. 1 to 3, the steering lock illustrated in these figures is provided within its housing 1 with a lock cylinder 2 having a locking drum 3. The locking drum 3 may be rotated in a customary manner by an ignition key 5 (FIG. 2), adapted to be inserted into a slot 4, from a stop position O (FIG. 3) into an assembly (accessory) position M and a drive position F, the locking drum is being shown in the latter position in FIG. 3. The ignition key 5 can be pulled out exclusively in the stop position O and in the accessory position M.

The locking drum 3 extends through the housing 1 up to a conventional ignition starter switch 6 (FIG. 2), by means of which the electrical installation of the motor vehicle is activated and the ignition system is turned on in the drive position F. As to the rest, the ignition key 5 can be further rotated in a conventional manner beyond the drive position F into a starting position (not shown) in which also the starter of the vehicle is turned on and an internal combustion engine is started. This operation of an ignition lock conventionally combined with the steering lock of the type described above is known as such and is therefore not described in detail herein.

As can be seen in particular from FIG. 1, the locking drum 3 extends through a guide frame 8 with its part 3a, which is strongly flattened on one side along a chord 7 but is cylindrical as to the rest; the guide frame 8 which is of substantially rectangular configuration is disposed at the inner end of the locking bolt 10 extending through the housing 1 in the direction toward the steering spindle 9 of the vehicle. The locking bolt 10 is elastically prestressed in the direction toward the steering spindle 9 by a compression spring 11 engaging, on the one hand, at the free end of the guide frame 8 and supported, on the other, at the housing wall and is displaced toward the steering spindle 9 by the compression spring 11 in case of a rotation of the lock drum 3 from its position shown in FIG. 1 in the counterclockwise direction through about 90°. The steering spindle 9 is provided with a slot 12 disposed in front of the locking bolt 10 when the steering is in a straight driving position; the locking bolt 10 engages into the slot 12, when the locking drum 3 is in the position described above, i.e., rotated through 90° and the steering spindle is in the straight driving position, and thus locks the steering. It can be seen from a comparison of FIGS. 1 and 3 that such a locking or blocking is not possible in the accessory position M or in the drive position F but only in the stop position O, or at best some degrees before this stop position O. This control of the locking pin 10 by the locking drum 3 of the steering lock is also conventional and therefore forms no part of the present invention.

As can be seen in particular from FIG. 2, the locking drum 3 is provided intermediate the part 3a and the ignition starter switch 6 with a further part 3b which in the illustrated drive position F of the locking drum 3 is provided with a segmental recess 13 toward one side of the housing 1. A solenoid 14 of conventional construction and therefore not shown and described in detail herein, is arranged in front of this recess 13 at the housing 1 of the steering lock, which controls a latching pin 15 displaceable into the segmental recess 13 through a corresponding housing aperture. The latching pin 15 which is retracted by a spring (not shown) out of the segmental recess 13 when the magnet coil of the solenoid 14 is de-energized, is displaced into the segmental recess 13 by the magnetic force of the magnet coil when the latter is energized. The segmental recess 13 extends over an angle of about 45° and therefore in the illustrated drive position of the locking drum 3 (see also FIG. 3) still leaves free a space in the clockwise direction to the latching pin engaging into the locking drum 3, which free space permits the locking drum 3 to rotate in the latched condition thereof in the counterclockwise direction up to the accessory position M. However, a further rotation of the locking drum 3 is not possible in the illustrated latched position of the latching pin 15. Consequently, also the locking pin 10 is always retained in its illustrated open or unlocked position, and a locking or blocking of the steering spindle 9 is made impossible under these conditions. Only when the solenoid 14 becomes de-energized at vehicle standstill and the latching pin 15 is thereupon correspondingly retracted, the ignition key 5 can be further rotated up to the stop position O, in which the flattened portion of the part 3a of the locking drum 3 flattened along the chord 7 permits to the locking bolt 10 to be displaced into its locking position by means of the compression spring 11 engaging at the guide frame 8, in which, in the illustrated angular position of the steering spindle 9, the locking bolt 10 engages into the bore 12 of steering spindle 9 and thus locks the steering.

The solenoid 14 is connected with a conventional electric switch S which is closed in dependence on the rotary movement of a conventional tachometer shaft T of the motor vehicle when the tachometer shaft rotates and which is opened when the tachometer shaft comes to a standstill or has nearly reached standstill. The closed switch connects the solenoid 14 to an energizing circuit fed by the battery of the vehicle so that the latching pin 15 is always displaced into the segmental recess 13 against the force of the aforementioned prestress spring when the vehicle is in motion, or is at least prestressed in that direction. Since the vehicle is normally set into motion as a rule only with a previously turned-on ignition and correspondingly in the drive position F of the ignition key 5, in which the segmental recess 13 is in front of the latching pin 15, this latching pin 15 is thus displaced always into the segmental recess 13 already during the first energization of the magnet coil of the solenoid 14 and thus latches by way of the locking drum 3 the locking bolt 10 in the illustrated unlocked position thereof. The ignition key 5 can therefore be rotated back into the stop position O and removed only when the vehicle is not moving, i.e., when it comes to a standstill and the latching bolt 5 is again displaced out of the segmental recess 13.

In the modified embodiment illustrated in FIG. 4, the solenoid 14 is not arranged within the area of the locking drum 3, but is arranged instead at the housing 1 directly within the area of the locking bolt 10 whereby the latching pin 15 can be displaced in a direction extending transversely to the locking bolt 10 through a corresponding aperture of the housing 1 up to a point where it engages into an annular groove 16 of the locking bolt 10 disposed, as according to FIG. 1, in its unlocked position.

The operation of the locking mechanism of FIG. 4, with the same connection of the solenoid as in the first embodiment, is quite similar to the latter.

If the internal combustion engine of the vehicle has been started by insertion of the ignition key 5 and by rotation thereof up to the starting position (not shown) and the ignition key 5 has been released again so that it assumes the drive position F illustrated in FIG. 3, then also the locking bolt 10 is in its open or unlocked position as can be seen from FIGS. 1 and 4, in which the annular groove 16 is disposed in front of the latching pin 15 of the solenoid 14 as shown in FIG. 4. As soon as a speed of the change-speed transmission of the vehicle is now engaged and the vehicle is set into motion, the latching pin 15 is also displaced in the illustrated manner into the annular groove 16 and thus latches the locking bolt 10 in the open or unlocked position thereof.

In contrast to the first embodiment, it is possible in the embodiment of FIG. 4 that the ignition key 5 can still be turned back into the stop position O during the drive of the vehicle and can be removed while the vehicle continues to move; however, since the latching pin 15 remains during the drive of the vehicle in the illustrated latching position, the locking bolt 10 nonetheless cannot reach its locking position in which it locks the steering. Only when the vehicle comes to a standstill and the solenoid 14 becomes de-energized by the opening of the aforementioned switch causing de-energization of the solenoid 14, also the latching pin 15 is again retracted into the solenoid 14 and the locking bolt 10 is displaced by the compression spring 11 into its locking position.

While I have shown and described only two embodiments in accordance with the present invention, it is understood that the same is not limited thereto but is susceptible of numerous changes and modifications as known to those skilled in the art. Thus, the switch operable to energize and de-energize the solenoid, instead of being actuated by the tachometer shaft, may also be actuated in any known manner from any other part of the wheel drive system of the vehicle which rotates when the vehicle wheels rotate. Consequently, I do not wish to be limited to the details shown and described herein but intend to cover all such changes and modifications as are encompassed by the scope of the appended claims.

What is claimed:

1. A steering lock arrangement for motor vehicles having an electrical system; said arrangement comprising: a movable spindle locking member engageable in a locking position thereof into a steering spindle of the vehicle to preclude turning of said steering spindle, a locking drum means which is movable between a position corresponding to an inoperative vehicle electrical system to at least one other position corresponding to an operative vehicle electrical system, interconnecting means operatively arranged between said spindle locking member and said locking drum means for moving said spindle locking member toward the locking position thereof when said locking drum means is in the position corresponding to an inoperative vehicle electrical system and for moving said spindle locking member toward an unlocked position with respect to said steering spindle when said locking drum means is in a position corresponding to an operative vehicle electrical system, steering lock housing means for supporting said locking drum means and said spindle locking member means in position with respect to one another and with respect to said steering spindle, vehicle motion detecting means, safety latching means mounted at said steering lock housing for precluding displacement of said spindle locking member to its locking position when said safety latching means is activated, and control means responsive to said detecting means for automatically activating said safety latching means when said vehicle motion exceeds a predetermined value, whereby inadvertent locking of said steering spindle during driving of the vehicle is automatically precluded and whereby automatic locking of said steering spindle when said vehicle electrical system is inoperative and said vehicle motion is below said predetermined value is assured, wherein said safety latching means includes a detent pin member movably engageable into a corresponding opening in one of said locking drum means and said spindle locking member, wherein a portion of said detent pin member extends through a magnetic coil of a solenoid which is directly controlled by an electrical signal from said detecting means, and wherein said control means includes an electric switch means for selectively energizing said solenoid, wherein said vehicle motion detecting means includes a further part of the vehicle that rotates whenever the vehicle is in motion, said switch means being operatively connected with said further part such that rotation of said further part automatically switches on said electric switch means in the sense of closing an electric circuit of said magnetic coil and energizing the same.

2. A steering lock for motor vehicles with an electrical system, which comprises a prestressed locking bolt elastically engaging in the locking position thereof into a steering spindle of the vehicle, and in which a cylinder lock means combined with the steering lock includes a locking drum means, said locking bolt being adapted to be retracted into it sunlocked position releasing the steering spindle when the locking drum means is rotated into its drive or accessory position in which the electrical system is activated, characterized by spring-loaded latching pin means displaceably guided at the steering lock housing, said latching means being normally spring-stressed into its retracted unlatched position, and control means controlling said latching means in such a manner that when the vehicle is in motion, said latching means is displaced against its spring force into an aperture provided in a part of the steering lock which precludes displacement of the locking bolt until the vehicle comes at least nearly to standstill, said latching means including a latching pin displaceable in a direction forming an angle to the axis of the locking bolt, further characterized in that said control means includes a solenoid controlling the latching means and provided with a magnetic coil, said solenoid being selectively energized by electric switch means operatively connected with a further part of the vehicle that rotates whenever the vehicle is in motion such that rotation of said further part automatically switches on said switch means in the sense of closing an electric circuit of said magnetic coil and energizing the same.

3. A steering lock according to claim 2, characterized in that said aperture is a segmental recess provided in the locking drum means which faces the latching means in the driving or accessory position of the drum means.

4. A steering lock according to claim 2, characterized in that said aperture is a cross groove of the locking bolt which is in line with the movement of the latching means when the locking bolt is in the unlocked position.

5. A steering lock according to claim 3, characterized in that said further part is the tachometer shaft.

6. A steering lock according to claim 3, characterized in that said angle is about 90°.

7. A steering lock arrangement for motor vehicle having an electrical system; said arrangement comprising: a movable spindle locking member engageable in a locking position thereof into a steering spindle of the vehicle to preclude turning of said steering spindle, a locking drum means which is movable between a position corresponding to an inoperative vehicle electrical system to at least one other position corresponding to an operative vehicle electrical system, interconnecting means operatively arranged between said spindle locking member and said locking drum means for moving said spindle locking member toward the locking position thereof when said locking drum means is in the position corresponding to an inoperative vehicle electrical system and for moving said spindle locking member toward an unlocked position with respect to said steering spindle when said locking drum means is in a position corresponding to an operative vehicle electrical system, steering lock housing means for supporting said locking drum means and said spindle locking member means in position with respect to one another and with respect to said steering spindle, vehicle motion detecting means, safety latching means mounted at said steering lock housing for precluding displacement of said spindle locking member to its locking position when said safety latching means is activated, and control means responsive to said detecting means for automatically activating said safety latching means when said vehicle motion exceeds a predetermined value, whereby inadvertent locking of said steering spindle during driving of the vehicle is automatically precluded and whereby automatic locking of said steering spindle when said vehicle electrical system is inoperative and said vehicle is below said predetermined value is assured, wherein said safety latching means includes detent means engageable into opening means on said locking drum means to prevent rotation of said locking drum means to said position corresponding to an inoperative vehicle electrical system when said vehicle motion exceeds said predetermined value, and wherein said detent means and opening means are configured to permit rotation of said locking drum means between a plurality of positions corresponding to an operative vehicle electrical system when said safety latching means is activated.

8. An arrangement according to claim 7, wherein said detent means includes a detent pin member movably engageable into a corresponding opening in one of said locking drum means and said spindle locking member.

9. An arrangement according to claim 8, wherein a portion of said detent pin member extends through a magnetic coil of a solenoid which is directly controlled by an electrical signal from said detecting means.

10. An arrangement according to claim 9, wherein said portion of said pin member is axially aligned with a portion of said pin member which engages in the corresponding opening in one of said locking drum means and said spindle locking member.

11. An arrangement according to claim 7, wherein said detent means includes a detent pin member movably engageable into an opening on the circumference of said locking drum means to prevent rotation of said locking drum means to said position corresponding to an inoperative vehicle electrical system when said vehicle motion exceeds said predetermined value.

12. A steering lock arrangement for motor vehicles having an electrical system; said arrangement comprising: a movable spindle locking member engageable in a locking position thereof into a steering spindle of the vehicle to preclude turning of said steering spindle, a locking drum means which is movable between a position corresponding to an inoperative vehicle electrical system to at least one other position corresponding to an operative vehicle electrical system, interconnecting means operatively arranged between said spindle locking member and said locking drum means for moving said spindle locking member toward the locking position thereof when said locking drum means is in the position corresponding to an inoperative vehicle electrical system and for moving said spindle locking member toward an unlocked position with respect to said steering spindle when said locking drum means is in a position corresponding to an operative vehicle electrical system, steering lock housing means for supporting said locking drum means and said spindle locking member means in position with respect to one another and with respect to said steering spindle, vehicle motion detecting means, safety latching means mounted at said steering lock housing for precluding displacement of said spindle locking member to its locking position when said safety latching means is activated, and control means responsive to said detecting means for automatically activating said safety latching means when said vehicle motion exceeds a predetermined value, whereby inadvertent locking of said steering spindle during driving of the vehicle is automatically precluded and whereby automatic locking of said steering spindle when said vehicle electrical system is inoperative and said vehicle motion is below said predetermined value is assured, wherein said safety latching means includes a detent pin member movably engageable into an opening on the circumference of said spindle locking member, whereby locking of said spindle is prevented whenever said vehicle motion is above said predetermined value independently of the rotative position of said locking drum means, 13. An arrangement according to claim 12, wherein a portion of said detent pin member extends through a magnetic coil of a solenoid which is directly controlled by an electrical signal from said detecting means.

14. An arrangement according to claim 13, wherein said portion of said pin member is axially aligned with a portion of said pin member which engages into said opening on the circumference of said spindle locking member.

15. An arrangement according to claim 14, wherein said pin member extends at a right angle with respect to the longitudinal extent of said spindle locking member.

16. An arrangement according to claim 15, wherein said opening on the circumference of said spindle locking member is a circumferential slot.

17. A steering lock arrangement for motor vehicles having an electrical system; said arrangement comprising: a movable spindle locking member engageable in a locking position thereof into a steering spindle of the vehicle to preclude turning of said steering spindle, a locking drum means which is movable between a position corresponding to an inoperative vehicle electrical system to at least one other position corresponding to an operative vehicle electrical system, interconnecting means operatively arranged between said spindle locking member and said locking drum means for moving said spindle locking member toward the locking position thereof when said locking drum means is in the position corresponding to an inoperative vehicle electrical system and for moving said spindle locking member toward an unlocked position with respect to said steering spindle when said locking drum means is in a position corresponding to an operative vehicle electrical system, steering lock housing means for supporting said locking drum means and said spindle locking member means in position with respect to one another and with respect to said steering spindle, vehicle motion detecting means, safety latching means mounted at said steering lock housing for precluding displacement of said spindle locking member to its locking position when said safety latching means is activated, and control means responsive to said detecting means for automatically activating said safety latching means when said vehicle motion exceeds a predetermined value, whereby inadvertent locking of said steering spindle during driving of the vehicle is automatically precluded and whereby automatic locking of said steering spindle when said vehicle electrical system is inoperative and said vehicle motion is below said predetermined value is assured, wherein said safety latching means includes a detent pin member movably engageable into an opening on the circumference of said locking drum means to prevent rotation of said locking drum means to said position corresponding to an inoperative vehicle electrical system when said vehicle motion exceeds said predetermined value, and wherein said opening on the circumference of said locking drum means is an arcuate circumferential slot having a circumferential length greater than the cross-section of said detent pin member for permitting rotation of said locking drum means between a plurality of positions corresponding to an operative vehicle electrical system when said safety latching means is activated.

18. An arrangement according to claim 17, wherein a portion of said detent pin member extends through a magnetic coil of a solenoid which is directly controlled by an electrical signal from said detecting means.

19. An arrangement according to claim 13, wherein said plurality of positions corresponding to an operative vehicle electrical system include a position corresponding to vehicle engine ignition and a position corresponding to operation of vehicle electrical accessories.

20. An arrangement according to claim 19, wherein said opening on the circumference of the locking drum means is disposed between a starter switch and a guide frame for guiding the spindle locking member, said starter switch and guide frame being operably movable by rotation of said locking drum means.

21. An arrangement according to claim 20, wherein said locking drum means includes a cam portion including a part-cylindrical part and a flattened part, said cam portion being abuttingly engaged with said guide frame, said flattened part extending approximately parallel the longitudinal extent of said spindle locking member when said spindle locking member is in an unlocked position and when said detent pin member is extending in a direction toward the circumferential center of said arcuate slot.

22. An arrangement according to claim 21, wherein said spindle locking member is rigidly attached to said guide frame, and wherein a spring member is positioned between said guide frame and said steering lock housing means to resiliently force said guide frame and spindle locking member in the spindle locking direction.

23. An arrangement according to claim 22, wherein a portion of said detent pin member extends through a magnetic coil of a solenoid which is directly controlled by an electrical signal from said detecting means.

* * * * *